(12) United States Patent
Foremski et al.

(10) Patent No.: US 11,736,362 B2
(45) Date of Patent: Aug. 22, 2023

(54) INTERNET ADDRESS STRUCTURE ANALYSIS, AND APPLICATIONS THEREOF

(71) Applicant: Akamai Technologies, Inc., Cambridge, MA (US)

(72) Inventors: Pawel J. Foremski, Gliwice (PL); Arthur W. Berger, Cambridge, MA (US); David J. Plonka, Somerville, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 17/875,494

(22) Filed: Jul. 28, 2022

(65) Prior Publication Data
US 2022/0368603 A1 Nov. 17, 2022

Related U.S. Application Data

(63) Continuation of application No. 17/195,281, filed on Mar. 8, 2021, now Pat. No. 11,405,286, which is a (Continued)

(51) Int. Cl.
*H04L 29/06* (2006.01)
*H04L 29/12* (2006.01)
(Continued)

(52) U.S. Cl.
CPC .......... *H04L 41/145* (2013.01); *H04L 41/142* (2013.01); *H04L 41/16* (2013.01);
(Continued)

(58) Field of Classification Search
CPC ............... H04L 41/145; H04L 61/5007; H04L 61/4511; H04L 41/142; H04L 41/16
See application file for complete search history.

(56) References Cited

U.S. PATENT DOCUMENTS

| | | | |
|---|---|---|---|
| 7,889,666 B1* | 2/2011 | Pei ......... | H04L 41/065 370/242 |
| 2007/0008962 A1* | 1/2007 | Basu ....... | H04L 45/745 370/389 |

(Continued)

*Primary Examiner* — Christopher B Robinson
(74) *Attorney, Agent, or Firm* — David H. Judson

(57) ABSTRACT

An analysis system automates IP address structure discovery by deep analysis of sample IPv6 addresses using a set of computational methods, namely, information-theoretic analysis, machine learning, and statistical modeling. The system receives a sample set of IP addresses, computes entropies, discovers and mines address segments, builds a network model of address segment inter-dependencies, and provides a graphical display with various plots and tools to enable a network analyst to navigate and explore the exposed IPv6 address structure. The structural information is then applied as input to applications that include: (a) identifying homogeneous groups of client addresses, e.g., to assist in mapping clients to content in a CDN; (b) supporting network situational awareness efforts, e.g., in cyber defense; (c) selecting candidate targets for active measurements, e.g., traceroutes campaigns, vulnerability assessments, or reachability surveys; and (d) remotely assessing a network's addressing plan and address assignment policy.

6 Claims, 3 Drawing Sheets

Related U.S. Application Data continuation of application No. 15/618,303, filed on Jun. 9, 2017, now Pat. No. 10,944,639.

(60) Provisional application No. 62/347,633, filed on Jun. 9, 2016.

(51) Int. Cl.
| | |
|---|---|
| *H04L 41/14* | (2022.01) |
| *H04L 41/142* | (2022.01) |
| *H04L 41/16* | (2022.01) |
| *H04L 61/4511* | (2022.01) |
| *H04L 61/5007* | (2022.01) |
| *H04L 61/5092* | (2022.01) |
| *H04L 101/659* | (2022.01) |
| *H04L 101/686* | (2022.01) |

(52) U.S. Cl.
CPC ...... *H04L 61/4511* (2022.05); *H04L 61/5007* (2022.05); *H04L 61/5092* (2022.05); *H04L 2101/659* (2022.05); *H04L 2101/686* (2022.05)

(56) References Cited

U.S. PATENT DOCUMENTS

| | | | |
|---|---|---|---|
| 2012/0102169 A1* | 4/2012 | Yu | H04L 63/1425 709/223 |
| 2015/0019719 A1* | 1/2015 | Alizadeh-Shabdiz | H04L 63/1408 709/224 |
| 2016/0021141 A1* | 1/2016 | Liu | H04L 63/1425 726/23 |

* cited by examiner

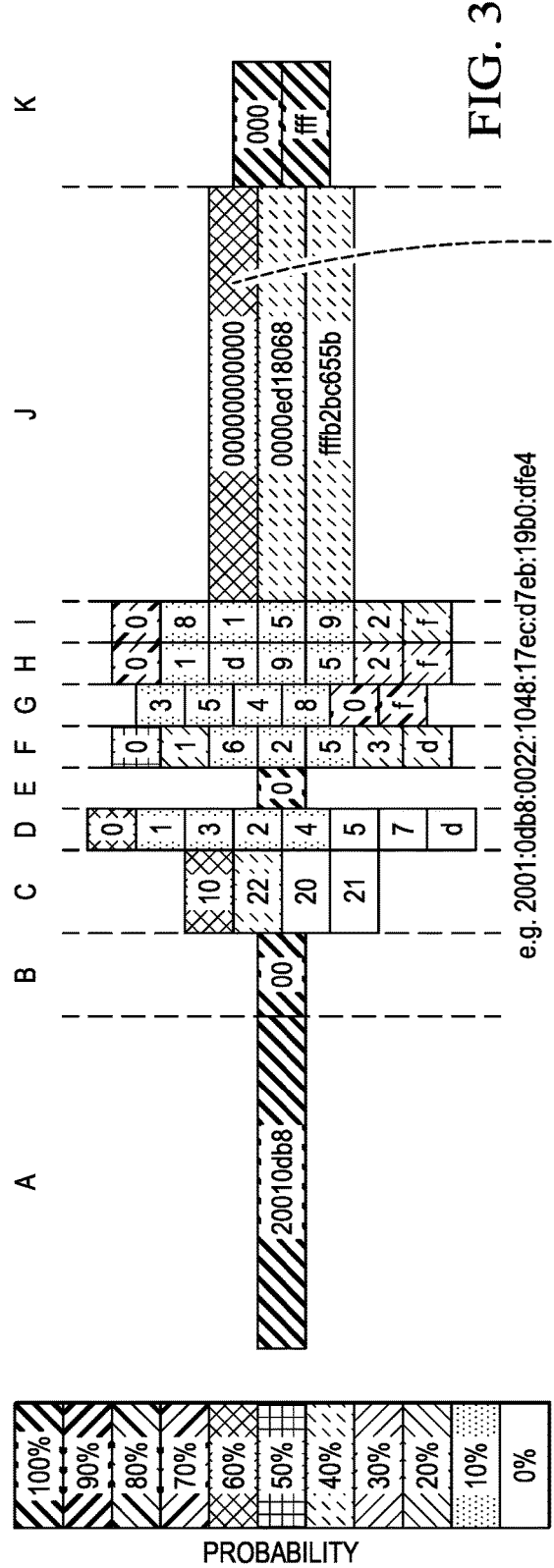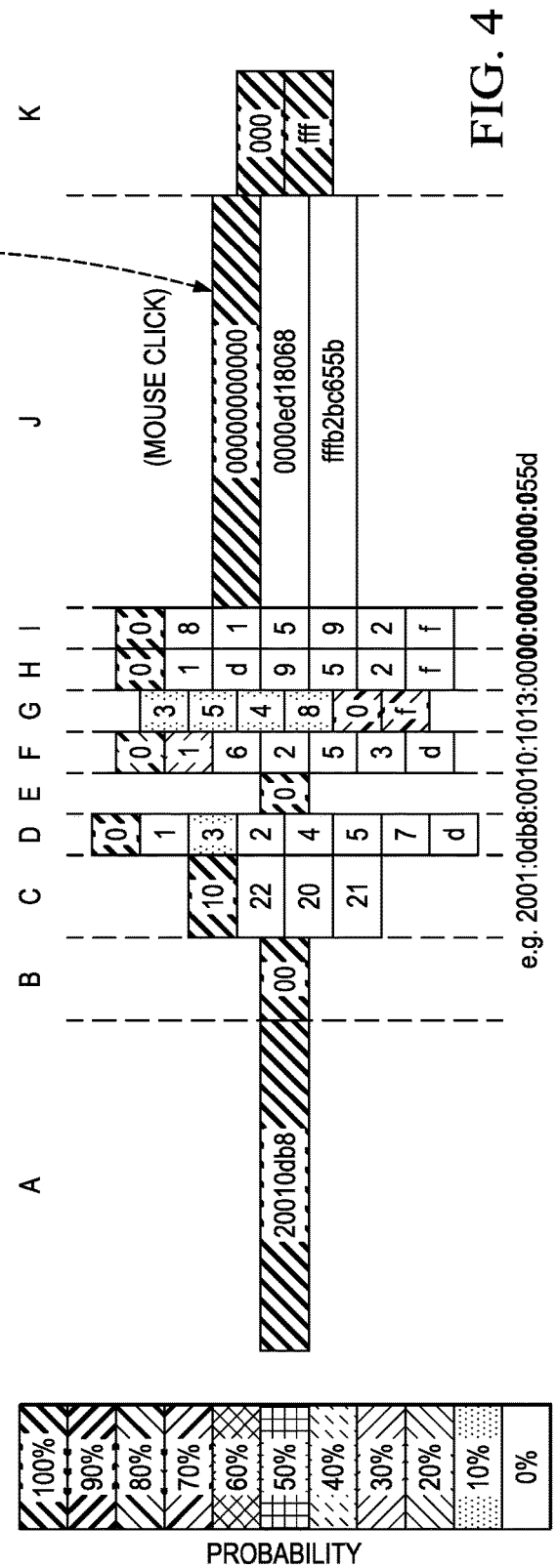

INTERNET ADDRESS STRUCTURE ANALYSIS, AND APPLICATIONS THEREOF

BACKGROUND

Technical Field

This application relates generally to network measurement techniques.

Brief Description of the Related Art

Internet resources are located using so-called Internet Protocol (IP) addresses. Internet Protocol v4 (IPv4) is the legacy Internet addressing scheme. The next generation Internet addressing scheme is IPv6. IPv6 deployment is increasing around the world, with nearly 25% of all networks now advertising IPv6 connectivity. A key feature of IPv6 is that IP addresses are 128 bits long, as opposed to the 32 bits that are used for IPv4 addresses. This is a substantial increase in address length. IPv6 addresses generally are written as eight groups of four-digit hexadecimal numbers. The top 64 bits of an IPv6 address are intended to be a network prefix, and the bottom 64 bits typically are the host. IPv6 address structure is described in Internet Standard documents, such as Request for Comment (RFC) 4291.

There are numerous applications of structural analysis of IP addresses that are active in a network. Among others, these applications include: (a) identifying homogeneous groups of client addresses, e.g., to assist in IP geolocation or in the mapping of clients to content hosted on Content Distribution Networks (CDNs); (b) supporting network situational awareness efforts, e.g., in cyber defense or in competitive analysis; (c) selecting candidate targets for active measurements, e.g., traceroutes campaigns, vulnerability assessments, or reachability surveys; and (d) remotely assessing a network's addressing plan and address assignment policy. Thus, for example, discovery of a network's address assignment policy is valuable for host reputation and access control, i.e., when mitigating abuse originating from sources within that network. Such external assessments are also valuable to the subject networks themselves, e.g., to assess potential security or privacy risks. Still other applications include detecting changes in network operation, estimating Internet usage over time, informing data retention policy to prevent resource exhaustion (e.g., when encountering many ephemeral addresses or prefixes, and others).

While the applications for Internet address structure analysis are broad, understanding the structure of Internet addresses has become increasingly complicated with the introduction, evolution and operation of IPv6. Complications arise from IPv6's address assignment features, e.g., stateless address auto-configuration (SLAAC), in which clients choose their own addresses, as well as the freedom allowed by IPv6's vast address space and enormous prefix allocations from address registries, e.g., $2^{96}$ addresses (by default), to each service provider. As of May 2016, estimates suggest that only 10% of World-Wide Web (WWW) users have IPv6 capability. Yet, even at this modest level, measurements show billions of active IPv6 WWW client addresses being used monthly, and tens to hundreds of millions of IPv6 router addresses.

There are numerous technical challeges in IPv6 address structure analysis. Thus, for example, addresses often differ in the spatial and temporal characteristics from one operator or network to the next. Complications include, without limitation, addresses with Modified EUI-64 interface identifiers that are not tagged as globally unique, stable addresses containing pseudo-random numbers in their interface identifiers, and even addresses containing pseudo-random numbers in their network identifiers.

There remains a need to provide systems and method for Internet IPv6 address discovery that addresses these and other problems in the known art.

BRIEF SUMMARY

This disclosure describes an analysis system that automates IP address structure discovery by deep analysis of sample IPv6 addresses using a set of computational methods, namely, information-theoretic entropy analysis, machine learning, and statistical modeling. In one embodiment, the system receives a sample set of IP addresses (e.g., gleaned by standard means, such as server logs, passive DNS, traceroute, etc.), and performs an entropy analysis. Preferably, the system computes (across the set of addresses) the entropy of the hexadecimal characters (referred to as "nybbles") at a given position in the address, and it does so for each hexadecimal-character position. This computation measures which parts of the IPv6 addresses are variable versus those that remain relatively constant. The entropy analysis identifies address sets that have very high entropy values across multiple adjacent nybbles (which likely represent pseudorandom segments), middle-to-high range entropy values, as well as abrupt changes in entropy between segments (which likely reveal addressing structure).

The output from the entropy analysis is then subjected to a cluster analysis, preferably by applying an unsupervised machine learning algorithm to discover and mine address segments. In particular, the machine learning clusters address segment values based on their distribution and the frequencies of occurrence of those values. The output of the cluster analysis is then subjected to a statistical modeling analysis. A preferred approach is to use Bayesian Networks (BNs) to statistically model the IPv6 addresses by automatically determining conditional probabilities amongst clusters of address segments' values in a hierarchical fashion (i.e., directed left-to-right) across the address segments. The results from the analytical analysis are then output to a network analyst (e.g., in a graphical web page), who can then navigate and explore the exposed IPv6 address structure.

Thus, for example, a graphical web page output to an analyst may include a plot of entropy and an aggregate count ratio (ACR), a BN showing address segments inter-dependencies, a segment value browser tool with a frequency heat map, and a target address generator, e.g., to generate candidate target addresses for active measurement (e.g., scanning). Other applications of the address structure information include, without limitation: (a) identifying homogeneous groups of client addresses, e.g., to assist in mapping clients to content in a CDN; (b) supporting network situational awareness efforts, e.g., in cyber defense; (c) selecting candidate targets for active measurements, e.g., traceroutes campaigns, vulnerability assessments, or reachability surveys; and (d) remotely assessing a network's addressing plan and address assignment policy.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 3 depicts a representative sample display of an interactive browser that decomposes IPv6 addresses into segments, values, ranges, and their corresponding probabilities;

FIG. 4 depicts what happens to the display in FIG. 3 when the conditional probability browser tool is used by the analyst.

DETAILED DESCRIPTION

Figure 1:
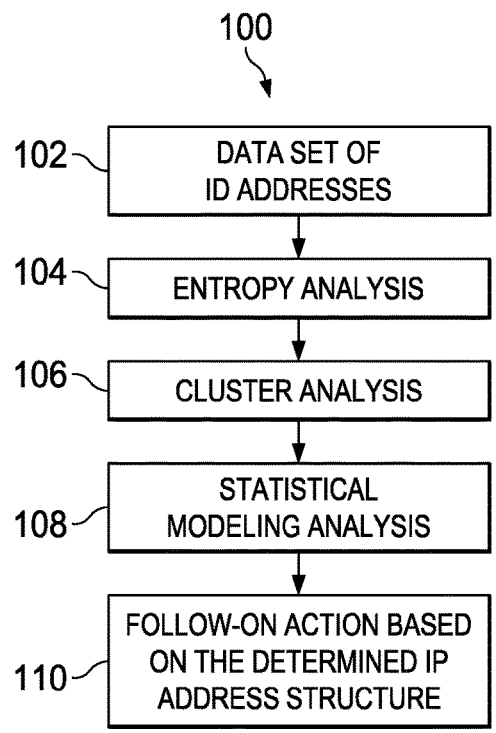
FIG. 1 is a block diagram depicting how the analysis system of this disclosure determines IPv6 address structure.

As described above, the approach herein provides an automated system that discovers aspects of networks' IPv6 address layout based on observations of a subset of that network's active addresses. The system may be implemented in one or more computing machines, e.g., associated with a content delivery network (CDN). As depicted in FIG. 1, the system 100 receives a sample set 102 of IP addresses. The sample set may be obtained by standard network data collection means, such as server logs, passive DNS, traceroute, etc. that are utilized in a CDN. Other sources of this network address data, e.g., any Internet service logging system, a network element or other middlebox traffic trace system, etc., may be used. Typically, the data set of IP addresses is obtained by passive observation of one or more network elements, such as routers, switches, taps, and the like. The data set may be pre-processed (e.g., aggregated by type, anonymized, etc.) and then supplied for analysis.

In particular, and with reference now to FIG. 1, the system 100 first performs an analysis of the diversity of address segments in the data set. In a preferred embodiment, a measure of diversity is performed by an entropy analysis 104. Preferably, the analysis 104 computes, across the set of addresses, the entropy of the hexadecimal characters (the "nybbles") at a given position in the address, and it does so for each hexadecimal-character position. This computation measures which parts of the IPv6 addresses are variable versus those which remain relatively constant. Preferably, the analysis 104 estimates entropy for each nybble in the IPv6 addresses, across the whole dataset. For example, if a particular nybble (such as the last one) is highly variable, then the corresponding entropy is high. Conversely, the entropy is zero for nybbles that stay constant across the dataset. In an alternative embodiment, the measure of diversity is a range, e.g., the maximum minus the minimum value of the nybbles, at a given position in the address. As will be seen, the approach enables the system to generate and graphically-plot a normalized value of entropy for each of the 32 nybbles, along with a preferably 4-bit Aggregate Count Ratio (ACR) calculated over each nibble. ACR is also a measure of diversity. The analysis then groups adjacent nybbles with similar entropy to form larger segments, with the expectation that these larger segments represent semantically different parts of each address. These segments are then labeled with letters and can be marked with dashed lines in the graphical plot (see FIG. 2). The entropy analysis identifies address sets that have very high entropy values across multiple adjacent nybbles (which likely represent pseudorandom segments), middle-to-high range entropy values, as well as abrupt changes in entropy between segments (which likely reveal addressing structure).

Figure 2:
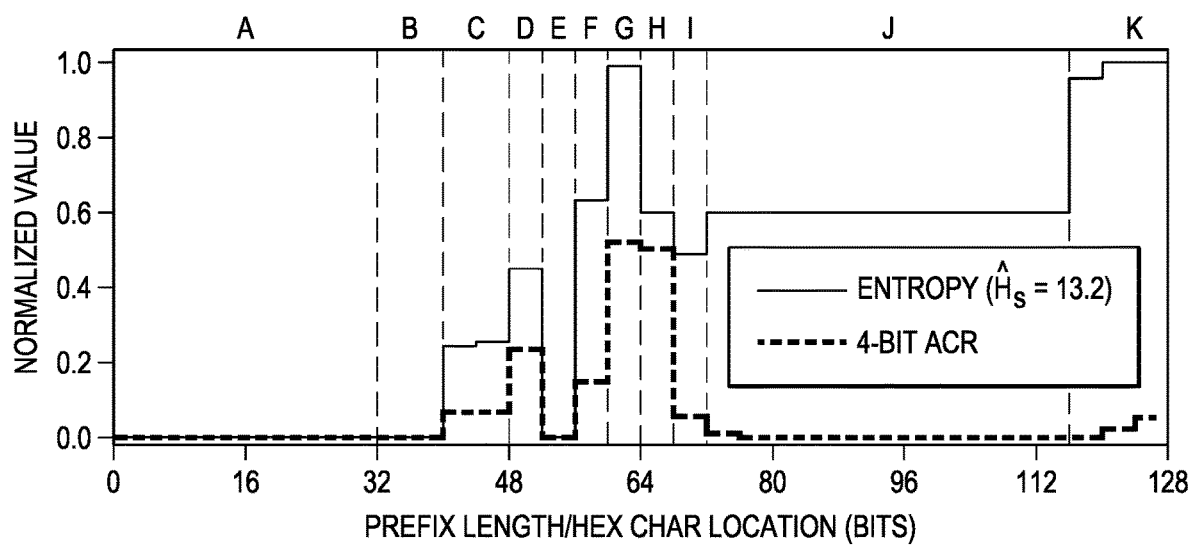
FIG. 2 depicts a sample display plot of normalized metrics of aggregate count ratio (ACR) per nibble, and entropy per nibble, across the data set.

As noted above, entropy is a measure of diversity of address segments in the data set, and as depicted in FIG. 2 is computed for segments of 4-bits, a nybble. More generally, entropy can be computed, across the set of addresses, for the value of one or more bits at any chosen positions within the address, not necessarily contiguous. In a more particular case, each address is partitioned into adjacent segments of bits, and the entropy is computed for each segment. Preferred segment lengths are, e.g., 1, 4, 8 and 16 bits.

The output from the entropy analysis 104 is then subjected to a cluster analysis 106, preferably by applying a machine learning algorithm to discover and mine address segments. In particular, the machine learning clusters address segment values based on their distribution and the frequencies of occurrence of those values. In this operation, the system searches the segments for the most popular values and ranges of values within them. By relying on the system's entropic underpinnings (provided by entropy analysis 104), the machine learning can be performed in an unsupervised manner, as it is not required to train the system to recognize well-known features, such as certain character strings in Modified EUI-64, or ostensibly pseudo-random numbers in privacy addresses. An unsupervised machine learning algorithm such as DBSCAN may be used. This analysis may also include using a statistical method to detect outliers.

After the cluster analysis analyzes distribution and frequencies of values inside address segments, the results are then subjected to a statistical modeling analysis 108 to search for statistical dependencies between the segments. A preferred approach is to use Bayesian Networks (BNs) to statistically model the IPv6 addresses by automatically determining conditional probabilities amongst clusters of address segments' values in a hierarchical fashion (i.e., directed left-to-right) across the address segments. Preferably, the addresses are represented as random vectors. BN is a statistical model that represents jointly-distributed random variables in the form of a directed acyclic graph. Each vertex in the graph represents a single variable X and holds its probability distribution conditioned on the variables that X depends on. An edge from vertex X to Y indicates that Y is statistically dependent on X. BN modeling is advantageous because it splits complex distributions into smaller, interconnected pieces, which are easier to comprehend and manage. The analysis 108 is designed to find a BN that represents a dataset of IPv6 addresses rewritten as random vectors. A tool that can be used to learn the structure of BN from data (i.e., discover statistical (in-)dependencies), as well as to learn its parameters (i.e., estimate the conditional probability distributions), is BNFinder, which implements the relevant methods. Because learning BNs from data is generally an NP-hard problem, the network preferably is constrained so that a given address segment only depends on previous segments. Once the BN model is found, it is used multiple purposes, as indicated at operation 110. Thus, for example, for statistical inference, a network analyst may query the BN with segment values to discover how those values affect the rest of the address. Or, the BN model itself may be used to programmatically generate candidate addresses that match the model, optionally constrained to certain segment values. These candidate addresses may then be used for targeted scanning of IPv6 networks, or other purposes.

In one embodiment, candidate targets are within the bounds (lowest and highest addresses) within the data set. Alternatively, candidate targets are outside the bounds of the data set.

FIG. 2 depicts a portion of a visual interface for the automated analysis system. In a representative embodiment, the visual interface is provided as a web page that is network accessible via a Web browser or similar access tool. In particular, FIG. 2 plots two normalized metrics: (1) aggregate count ratio (ACR) per nybble and (2) entropy per nybble, across the dataset. In this plot, it can be seen that the addresses (in the sample data set used to create it) are covered by one /40 prefix, and that their IIDs appear to be a mix of (a) privacy addresses (as suggested by decreasing ACR in bits 64-72, along with significant entropy across all bits 64-128), and (b) densely-packed addresses (as suggested by increasing ACR in bits 116-128). Address segments are comprised of nybbles having similar entropy, delineated by dashed vertical lines, and labeled with capital letters at the top.

The plot shown in FIG. 2 depicts segment value diversity and aggregate count ratio of the data set.

FIG. 3 depicts an example of a conditional probability browser tool that may comprise part of the visual interface. The tool is a show an interactive browser that decomposes IPv6 addresses into segments, values, ranges, and their corresponding probabilities. The browser enables exploring the underlying BN model to see how certain segment values probabilistically influence the other segments. Continuing with the example data set, FIG. 3 shows the addresses' entropy-derived segments, A through K (identified in FIG. 2), and the distributions of their respective values, preferably by colored heat map. In this example scenario, segment A always has the value 20010db8, which is reflected in 100% probability. Further, the length of segment C is two nybbles, in which four distinct values were observed: the most popular being 10 at 60%. Preferably, ranges are shown as two values (low-to-high) within one colored box, e.g., segment J having interval of 0000ed18068 to fffb2bc655b (40%).

FIG. 4 depicts what happens to the display when the conditional probability browser tool is used by the analyst. By clicking on one of the colored boxes, for example, the heat map may change, which reflects the fact that some segment values make the other values more (or less) likely. Thus, for example, here the analyst wants to determine how the probabilities would change if one conditioned them on segment J having the value 000000. When the analyst clicks on this value, the heat map (in FIG. 3) changes and shows that now C has the value 10 with 100% probability, and likewise for value 0 in segments H and I.

Figure 5:
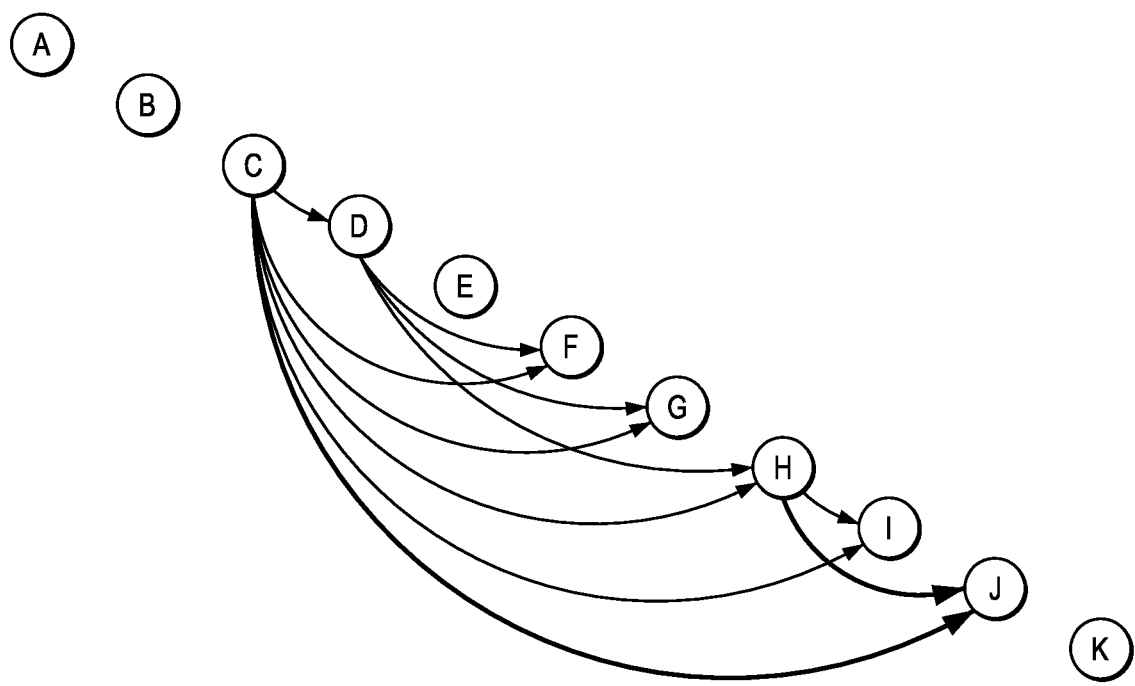
FIG. 5 depicts a BN plot generated in the visual interface and showing address segments inter-dependencies for the segments in the FIG. 4 plot.

FIG. 5 depicts a BN plot generated in the visual interface and showing address segments inter-dependencies for the segments in the FIG. 4 plot. Arrows indicate direct statistical influence, and the bolded arrows indicate direct probabilistic influence. Note that directly-connected segments can probabilistically influence each other in both directions (upstream and downstream). Under some conditions, segments without direct connection can still influence each other through other segments: e.g., A can influence C through B if C depends on B and B depends on A (even if there is no direct arrow between A and C).

As has been described, the automated system herein ingests a sample set of IP addresses, computes entropies, discovers and mines segments, builds a BN model, and optionally prepares a graphical web page with one or more of the following elements for a network analyst to navigate and explore: a plot of entropy and aggregate count ratio (FIG. 2), a segment value browser with frequency heat map (FIG. 3, FIG. 4), and a BN, showing address segments inter-dependencies (FIG. 5).

The analytics computed in this manner may be used for many different applications (use cases). As one example, the visual interface may also include a target address generator tool for selecting candidate targets for active measurements, e.g., traceroute campaigns, vulnerability assessments, or reachability surveys (within or without the address bounds of the data set). To this end, the browser may show an estimated proportion of the addresses matching a user selection (vs. the dataset), and the tool can then use those matches (or some portion of them) to generate the target addresses.

Analytics generated by the computational methods depicted in FIG. 1 may be provided programmatically or automatically to other systems. These systems may include one or more applications that utilize the information in one or more of the following purposes: (a) identifying homogeneous groups of client addresses, e.g., to assist in IP geolocation or in the mapping of clients to content hosted on Content Distribution Networks (CDNs); (b) supporting network situational awareness efforts, e.g., in cyber defense or in competitive analysis; (c) remotely assessing a network's addressing plan and address assignment policy, (d) detecting changes in network operation, (e) estimating Internet usage over time, (f) informing data retention policy to prevent resource exhaustion (e.g., when encountering many ephemeral addresses or prefixes, and others), and others. Thus, for example, discovery of a network's address assignment policy is valuable for host reputation and access control, i.e., when mitigating abuse originating from sources within that network. Such external assessments are also valuable to the subject networks themselves, e.g., to assess potential security or privacy risks. Still other applications include detecting changes in network operation, estimating Internet usage over time, informing data retention policy to prevent resource exhaustion (e.g., when encountering many ephemeral addresses or prefixes, and others).

Preferably, during the processing herein addresses and prefixes are classified in two ways: (1) temporally, according to their instances of activity to discern which addresses can be considered stable; and (2) spatially, according to a density or sparsity of aggregates in which active addresses reside. To this end, a temporal method of IPv6 classification is intended to determine address lifetime, primarily to separate those client addresses that are persistent or stable from those that are perhaps not. This stability analysis preferably is performed on an ongoing basis, and it may involve a sliding temporal period (e.g., 15 day)-window centered on the day of observation and spanning 7 days prior through 7 days following. Spatial methods of IPv6 address classification and prefix characterization are intended to both assess the proximity of addresses and prefixes and to visualize the address blocks in which they are contained. Preferably, prefixes are characterized structurally, then addresses therein are classified according to the densities of their containing, non-overlapping sub-prefixes.

While the temporal classification described above treats address sets as if they are a set of active addresses at one point-in-time, this is not a limitation. In an alternative embodiment, temporal considerations (the temporal characteristics of address sets) may be integrated into the above-described computational methods, e.g., to uncover boundaries of sequential and random assignments of addresses from dynamic pools that have been discovered in some networks. Another variant may involve structural analysis in time-series, e.g., to detect changes in network deployments. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

There is no limitation on the type of computing entity that may implement the functionality described herein. Any computing entity (system, machine, device, program, process, utility, or the like) may be used. As also noted, the entropy IP observation point may be co-located with a service or client, or it can be completely passive, with the observation at some network element, in the middle.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The technique herein has been described in the context of IPv6 address structure, but the techniques may also be used in a similar manner to determine the address structure of IPv4 addresses.

The technique for determining address structure herein (when applied, as has been described) provides for an improvement in another technology or technical field, namely, systems that identify and use homogeneous groups of client addresses, systems that provide network situational awareness functionality, network measurement systems, and others.

What is claimed is as follows:

1. An apparatus, comprising:
    a hardware processor;
    computer memory storing computer program code, the code comprising program code executed by the hardware processor and configured to:
        classify Internet Protocol (IP) addresses and prefixes (i) temporally, according to their instances of activity, to discern which addresses are considered stable, and (ii) spatially, wherein prefixes are characterized structurally, and then IP addresses therein are classified according to densities of contained non-overlapping sub-prefixes; and
        perform a computer network management task using the classified IP addresses and prefixes.

2. The apparatus described in claim 1 wherein the IP addresses are one of: IPv4 addresses, and IPv6 addresses.

3. The apparatus as described in claim 1 wherein the temporal classification is performed continuously over a given time period.

4. The apparatus as described in claim 3 wherein the given time period is a sliding temporal window centered on time of observation and spanning a first time period prior through a second time period following the time of observation.

5. The apparatus as described in claim 1 wherein the temporal classification determines a lifetime of an IPv6 address.

6. The apparatus as described in claim 1 wherein the temporal classification uncovers boundaries of sequential or random assignments of IP address from dynamic address pools.

* * * * *